United States Patent

Richard

[11] 4,023,751
[45] May 17, 1977

[54] FLYING SHIP

[76] Inventor: Walter A. Richard, 1501 Sabine Ave., Port Arthur, Tex. 77640

[22] Filed: July 28, 1976

[21] Appl. No.: 709,270

[52] U.S. Cl. .............................................. 244/23 C
[51] Int. Cl.² ..................... B64C 29/00; B64C 15/02
[58] Field of Search ............. 244/23 C, 23 B, 23 R, 244/12.1, 12.2, 12.3, 15, 165, 164, 23 A, 52, 12.4, 12.5; 60/39.34, 39.35

[56] References Cited

UNITED STATES PATENTS

| | | | |
|---|---|---|---|
| 2,705,867 | 4/1955 | Lewis | 60/39.34 |
| 2,989,271 | 6/1961 | Bohr | 244/23A |
| 3,148,848 | 9/1964 | Price | 244/23 D |
| 3,200,588 | 8/1965 | Math | 60/39.34 |
| 3,614,030 | 10/1971 | Moller | 244/23 C |
| 3,750,980 | 8/1973 | Edwards | 244/12.2 |
| 3,862,732 | 1/1975 | Wyatt et al. | 244/165 |
| 3,915,416 | 10/1975 | Anderson et al. | 244/165 |

*Primary Examiner*—Trygve M. Blix
*Assistant Examiner*—Galen L. Barefoot

[57] ABSTRACT

A flying ship is disclosed which comprises a hollow, saucer-shaped body having a convex upper surface surmounted at its center portion by a dome-shaped transparent canopy covering a passenger compartment, and a bottom including a generally concave major bottom portion, and an annular outer bottom portion which is inclined upwardly at its outer edge and is joined to the concave major bottom portion by a smooth upwardly open curve. Plural jet engines are adjustably mounted beneath the ship in a circular pattern inward of the outer edge and beneath the annular outer bottom portion to provide lift for take-off and landing, and horizontal thrust, as well as lift, for flight. An annular fluid motor is provided in the ship above the jet engines which includes an annular tube in which, an endless train of pistons is slidably mounted. Fuel from an annular fuel tank is pumped through a distributor and plural injectors into the annular fluid motor tube at an angle whereby the kinetic impact of the injected fuel propels the train of pistons in one direction at sufficient speed to give gyroscopic stability to the ship. A fuel outlet port is provided in the annular fluid motor tube above each engine to supply fuel from the annular fluid motor to the jet engines. Each jet engine includes a combustion chamber formed inside of a ball and socket joint, a fuel inlet on one side of the ball and socket joint which provides communication between the fuel outlet from the annular fluid motor tube and the interior of the combustion chamber, and a jet discharge nozzle provided on the side of the ball and socket joint opposite the fuel inlet.

12 Claims, 17 Drawing Figures

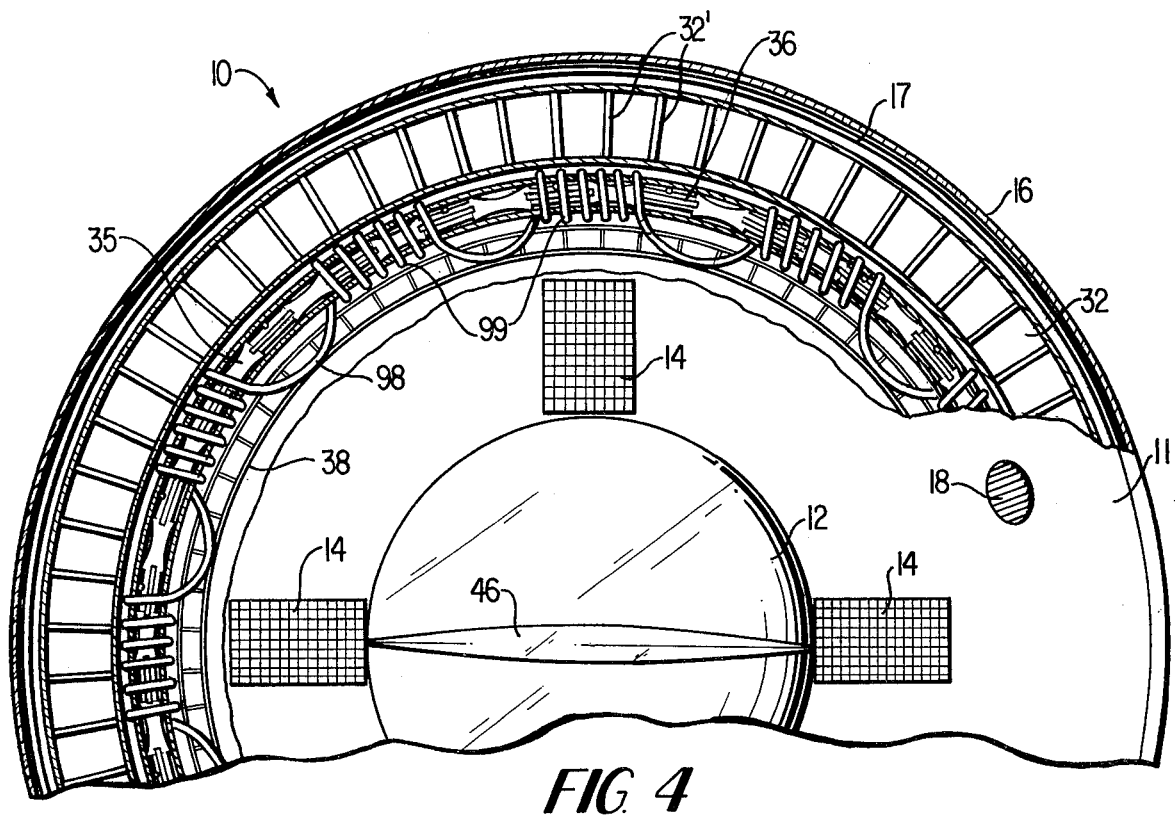
FIG. 4
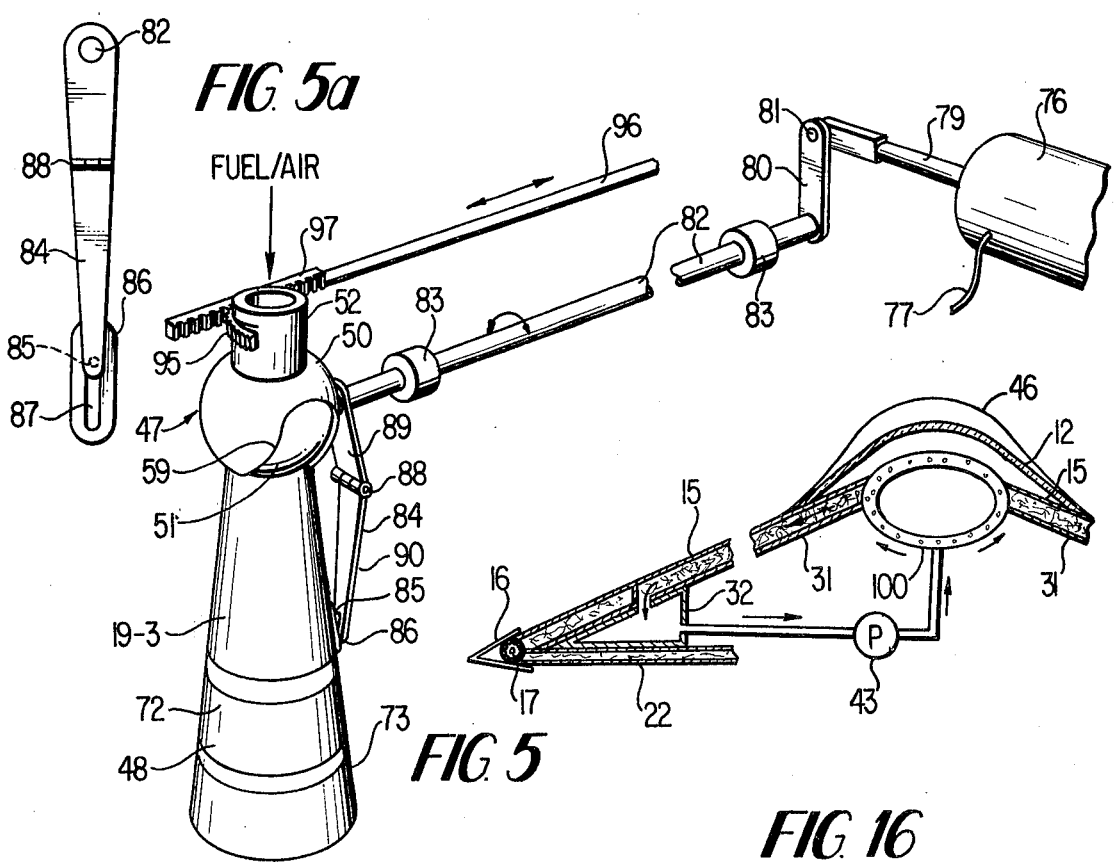
FIG. 5a
FIG. 5
FIG. 16

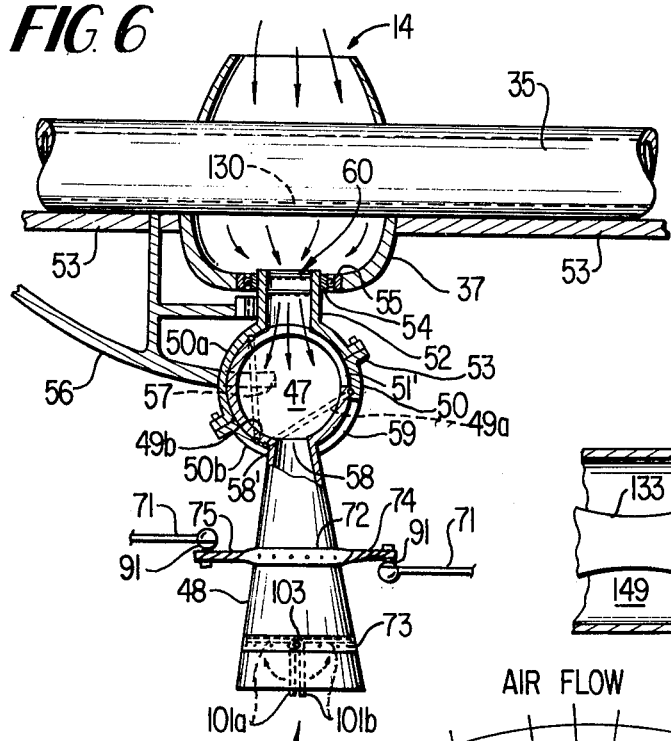
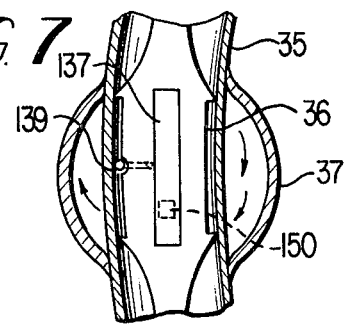
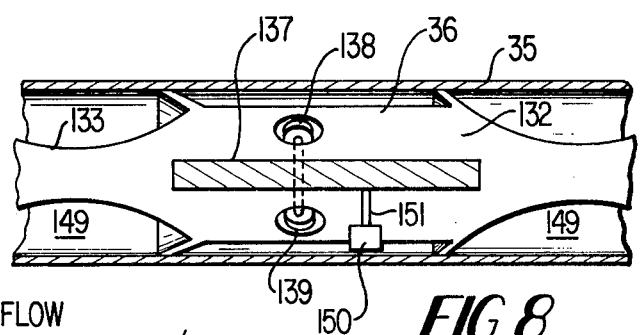
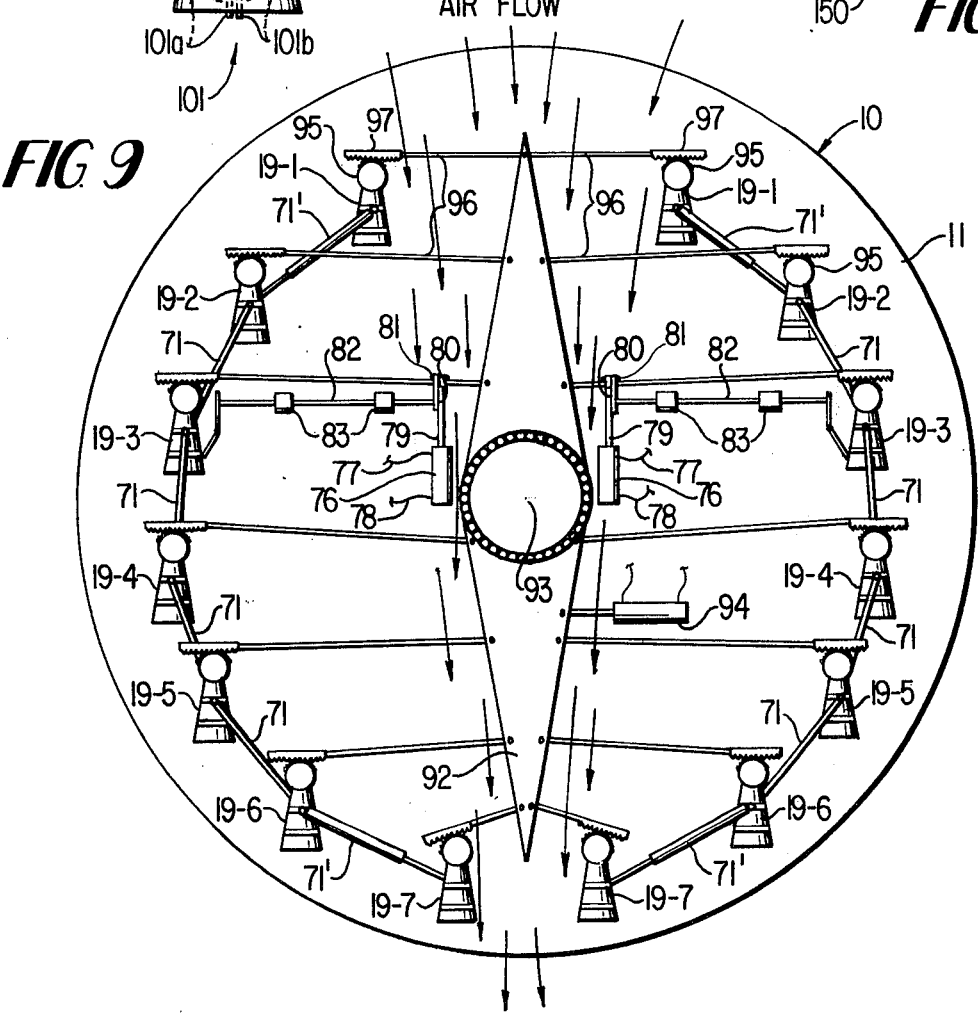

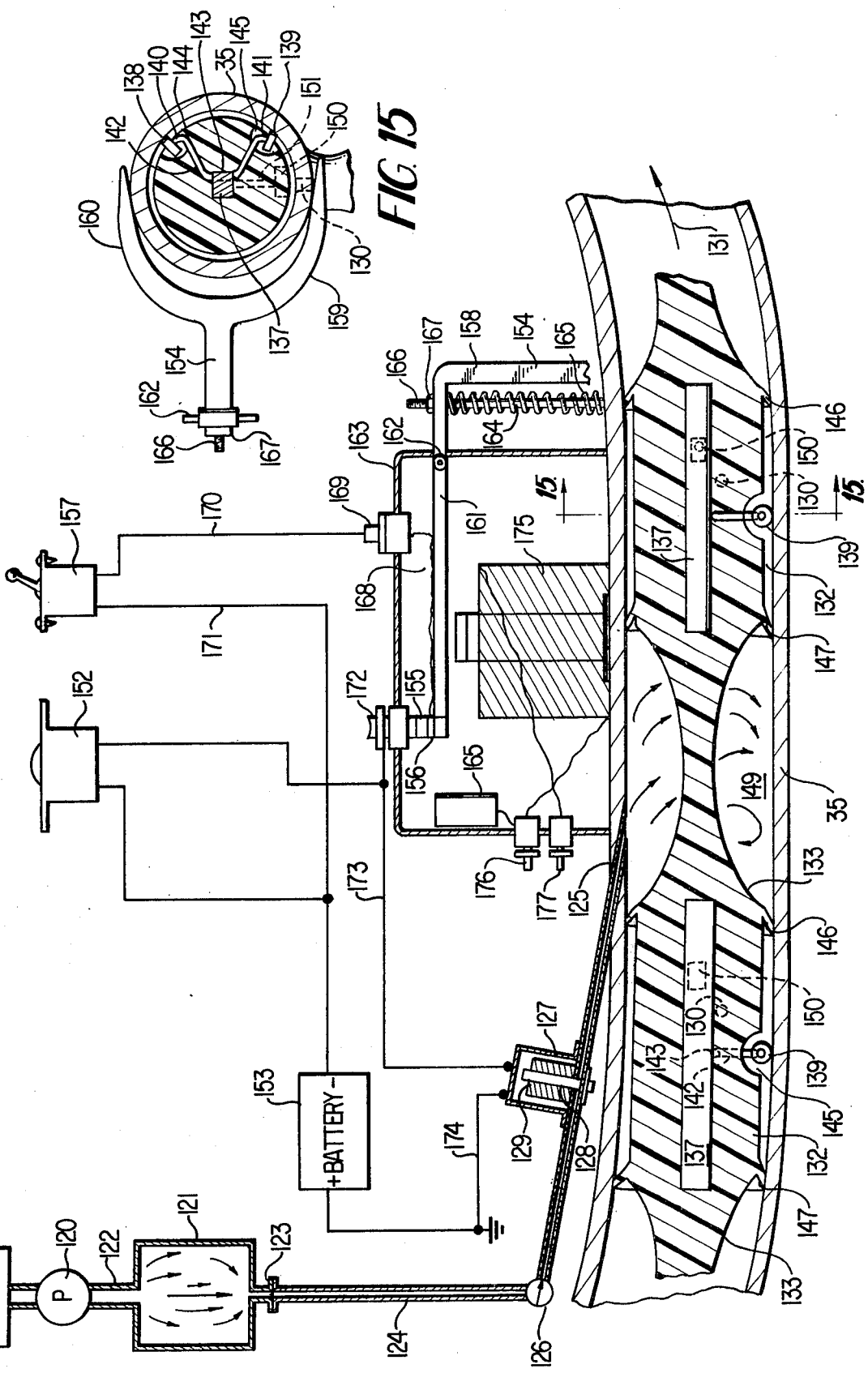

FLYING SHIP

This invention relates to an improved flying ship and particularly to one having a hollow saucer-shaped body and plural adjustably mounted jet engines which provide in one position vertical lift for take-off and descent, and which when rotated and tilted from the one position provide horizontal directional thrust and vertical lift.

It is an object of the invention to provide an improved flying ship which includes one or more of the following special features:

1. A degaussing system comprising a degaussing cable provided about the outer edge of the ship and encased in a V-shaped outer shield.

2. A coolant system for cooling the ship comprising an annular coolant tank provided within the ship inboard of and adjacent the degaussing cable, spaced inner and outer upper shells for the ship providing a fluid passage therebetween, a pump and conduits for causing the flow of coolant from the coolant tank to the top of the ship and an annular distributor pipe at the top of the ship for distributing the coolant evenly into the space between the inner and outer top shells so that the coolant flows between the shells and is returned to the coolant tank.

3. A gyroscopic stablizing system comprising an annular fluid motor having an annular fluid motor tube mounted coaxially within the ship, an endless train of pistons slidably mounted within the annular fluid motor tube, fluid injection means extending through the annular fluid motor tube for injecting pressurized fuel into the tube to give kinetic impact to the pistons and to cause the pistons to slide in one direction with sufficient speed to give gyroscopic stability to the ship, and plural outlets for the injected fluid.

4. An electrical generator system including the annular fluid motor of (3) above, and a generator coil wound around the annular fluid motor tube, each of the pistons of the endless piston train having a permanent magnet core which creates a flux field. The flux field, as the endless train moves through the annular motor tube and generator coil windings, is cut by the coil and causes electricity to be generated.

BRIEF DESCRIPTION OF THE DRAWINGS

With the foregoing more important objects and features in view and such other objects and features which may become apparent as this specification proceeds, the invention will be understood from the following description taken in conjunction with the accompanying drawings, in which like characters of reference are used to designate like parts, and in which:

FIG. 4 is a partial top plan view of the flying ship with portions of the outer surface broken away to expose the interior structure;

FIG. 5 is a perspective view of one of the jet engines and controls for directing the jet engine;

FIG. 5a is a detail view of one of the control elements shown in FIG. 5;

FIG. 6 is a partial vertical sectional view through a portion of the bottom of the flying ship and one of the jet engines;

FIG. 7 is a detailed horizontal sectional view through a segment of the fluid motor tube and air intake shroud shown in FIG. 6;

FIG. 8 is a vertical sectional view through a segment of the fluid motor tube and a portion of the endless motor train therein;

FIG. 9 is a diagramatic top plan view showing the arrangment of the jet engines of the flying ship and directional controls therefor;

FIG. 14 is a horizontal cross-sectional view of a portion of the fluid motor showing diagramatically the fuel injection system and the electrical controls for the fuel injection system;

FIG. 15 is a sectional view taken on line 15—15 of FIG. 14;

FIG. 16 is a fragmentary vertical sectional view through the upper surface portions of the ship showing the ship's cooling system.

DETAILED DESCRIPTION OF A PREFERRED EMBODIMENT

Figure 1:
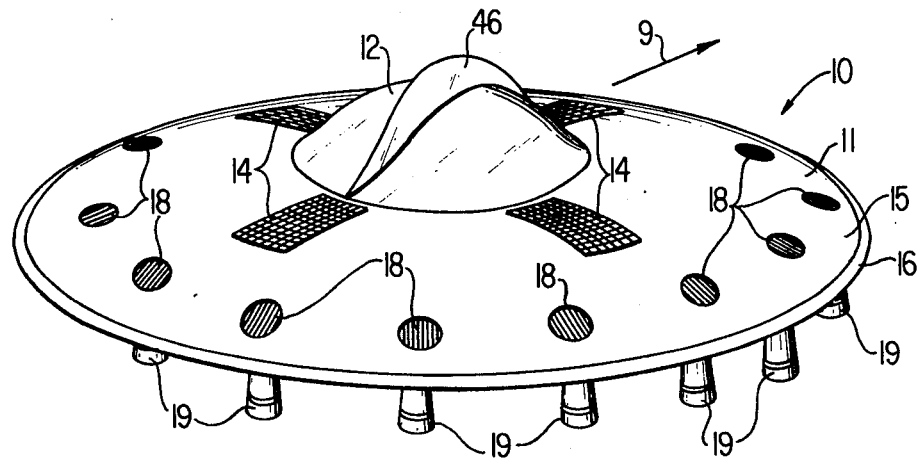
FIG. 1 is a perspective view of the invention looking at its topside.

Referring first to FIG. 1 of the drawings, a preferred embodiment of the flying craft of this invention is generally indicated by the arrow 10. The flying craft 10 comprises a hollow, saucer-shaped body 11 at the top center of which is mounted a transparent dome-shaped canopy member 12 of Plexiglas, or other strong, transparent material, covering a cockpit, or passenger compartment 13. Four solar energy panels 14 are mounted flush with the downwardly curved, generally convex, upper surface 15 of the flying craft 10 to convert solar energy into electrical energy for use in the carft. At the outer edge of the saucer-shaped body 11 is a V-shaped shield 16 which covers a degaussing cable 17 which will be subsequently described. A plurality of air intake grills 18 are mounted flush with the upper surface 15 in a circular arrangment to supply air to a plurality of jet engines 19 which are mounted under the flying craft 10. Each air intake grill 18 supplies air to one jet engine 19 of which there are fourteen provided in the preferred embodiment.

Figure 2:
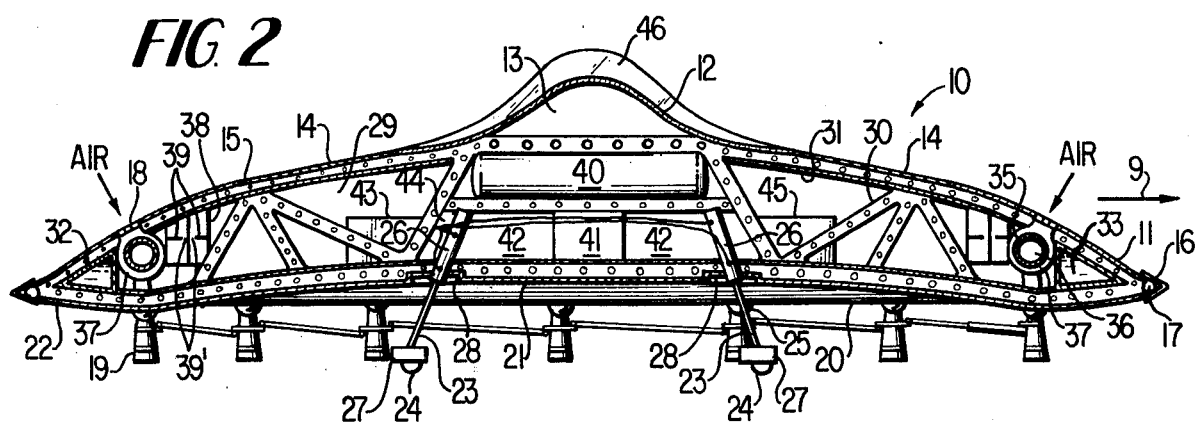
FIG. 2 is a vertical cross-sectional view taken along a fore and aft center line through the flying ship.
Figure 3:
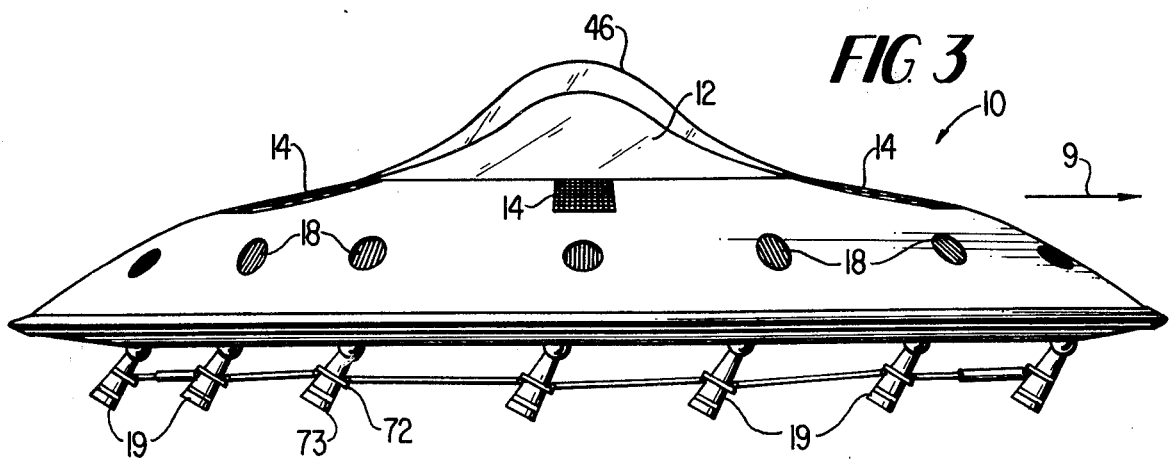
FIG. 3 is a side elevational view of the flying ship of this invention.

Looking now at the vertical section of the invention shown in FIG. 2, the greater central portion 21 of the bottom surface 20 of the flying craft 10 is seen to be upwardly dished in a generally concave configuration, while the outer portion 22 is inclined downward from the outer edge and then rises to the concave portion 21 in a smooth curve. Extending beneath the dished portion 21 are plural landing gear 23, each comprising a caster wheel 24 mounted on the end of a strut 25 which is retractable into the floor of the craft after take-off by means of the reciprocating fluid motors 26 of the piston and cylinder type. Hydraulic fluid for operating the motors 26 is supplied by pumping means 44. A circular wheel cover 27 encompasses each caster wheel 24, and fills a circular opening 28 provided in the bottom portion 21 when the strut 25 is retracted into the floor of the craft 10.

The hollow interior 29 of the flying craft 10 is provided with structural framework 30 comprising lightweight metal framing members preferably of magnesium or other lightweight, high strength material. The top wall of the craft 10 has spaced outer and inner surface coverings 15 and 31 respectively between which a coolant fluid flows by gravity from the upper portion of the wall into an annular coolant tank 32 provided adjacent the outer rum or shield 16. Coolant fluid 33 is pumped by suitable pumping means 43 from the tank 32 to the space between the skins 15 and 31 in the upper region thereof. An annular fluid motor tube 35 is provided inwardly of the coolant tank 32, and an endless train 36 of spaced pistons is slidably mounted within the tube. Surrounding the motor tube 35 are plural air ducts 37 which connect the air intake grills 18 with jet engines 19. Inwardly of the motor tube 35 is an annular fuel tank 38 for supplying fuel to the jet engines 19. The tank 38 has interior baffles 39 to prevent sudden shifting of the fuel in the tank. Small holes 39' in the baffles 39 allow fuel to bleed through in order to keep the craft balanced at all times. Directly beneath the cockpit 12 is an oxygen supply tank 40 for supplying oxygen to the sealed pressurized cockpit compartment 13 and to additional pressurized compartments 42,42 beneath the oxygen tank 40. A liquid oxygen tank 41 is mounted vertically at the center of the craft 10. The oxygen in the tanks 40 and 41 are for use in outer space to provide for the passengers on board the craft and to inject into the intake of the jet engines 19 in order to obtain a good burn. A battery pack 45 provides electrical energy for the electrical equipment of the craft. It is charged by the solar panels 14 and by an electric generator combined with the fluid motor 35.

The flying saucer 10 as seen in FIG. 1 faces forward in the direction of the arrow 9. A fin 46, surmounts the canopy 12 and is secured thereto to provide reinforcement for the canopy. The ridge of the fin 46 lies in a vertical plane through the vertical axis of the saucer in the fore and aft direction of the ship.

There are seven jet engines provided on each side of the saucer relative to the fin 46. The engines, starting at the front and counting toward the rear on each side of the saucer are numbered 19-1 through 19-7 consecutively (See FIG. 9). The number one engines on opposite sides of the ship are spaced a greater distance apart than the number 7 engines at the rear of the ship. The jet engines are positioned on a circle which is coaxial with the center axis of the saucer 10; they are spaced along the circle so that the circular arcs between adjacent engines on the same side of the saucer are equal. The arrangement of the jet engine 19 is seen most clearly in FIG. 9.

Each of the jet engines 19 includes a combustion chamber 47 and a jet nozzle 48. The combustion chamber 47 comprises an outer ball socket member 50 having an interior spherically formed surface and an inner ball member 51 having an exterior spherically formed surface. The inner ball member 51 fits closely within the outer socket member 50 and slides relative thereto in the manner of a ball and socket joint. The hollow interiors of members 50 and 51 form the combustion chamber 47.

The outer ball 50 comprises two hemispherical sections 50a, and 50b which are joined together by a bolted flange joint 53. The lower section 50b has a slot 59 formed therein through which the narrow throat portion 58' of the jet nozzle 48 projects. The slot 59 extends from the bottom of the ball 50 in a rearwardly and upwardly extending arc to permit the nozzle to swing from a vertically downward position (as shown in FIG. 9) to an approximately horizontal position (not shown).

The inner ball 51 is a completely spherical hollow ball. It is provided with a fuel inlet slot 51' in its upper portion which is of sufficient arcuate length to assure that there is communication between the interior of the inner ball 51 and the passage through the cylindrical stem 52 of the outer ball when the jet nozzle 48 is in a vertically down position as well as when the jet nozzle 48 is in an approximately horizontal position. A throat aperture 58 is provided at the bottom of the ball into which the small end 58' of the jet nozzle is fitted and secured by welding or other suitable means. The inner surface of the inner and outer ball and the jet nozzle are coated with a heat and corrosion resistant coating of hard metal alloy or other refractory material. The outer surfaces of the outer ball 50 and of the jet nozzle 48 are preferably provided with cooling fins (not shown). The outer surface of the inner ball and the inner surface of the outer ball are finished within close tolerances so that the inner ball is free to rotate within the outer ball. If properly finished, the inner and outer ball will be substantially self-sealing against the flow of gases from the combustion chamber 47 outwardly between the inner and outer ball surfaces. However, to insure a proper seal between the inner and outer balls 50,51, a pair of metallic sealing rings 49a and 49b are seated in grooves provided in the outer surface of the inner ball 51 so as to bear against the inner surface of the outer ball 50.

When assembling the jet engines 19, the two outer ball sections 50a and 50b are initially separate, and the jet nozzle is separate from the inner ball 51. The inner ball is first seated in the bottom half 50b of the outer-ball with the throat 58 aligned with the slot 59 in the outer ball section 50b. The small end of the jet nozzle 48 is then inserted in the throat 58 of the inner ball and is secured therein as by welding or other suitable means. Finally, the upper ball section 50a is placed over the upper portion of the inner ball 51 and the bottom portion 50b of the outer ball and is secured to the bottom portion 50b by means of the bolted flange joint 53.

As seen in FIG. 6, the outer ball-socket member 50 has a cylindrical stem 52 which projects outwardly therefrom in an upward direction so that the axis of the stem 52 passes through the geometric center of the inner and outer ball members 50 and 51. The stem 52 projects upwardly through a circular opening 55 in the air shroud 37 depending from the planar support member 53 secured to the bottom of the ship 10. An anti-friction bearing 54 rotatably supports the stem 52 in the opening 55. A thrust brace 56 depending angularly from beneath the support member 53 in the direction of the combustion chamber 47, includes an arcuate yoke 57 which partially encompasses the outer ball member 50 and gives support thereto. The inner face of the arcuate yoke 57 may be provided with anit-friction surface means such as roller or ball bearings.

The jet nozzle 48 is of frusto conical shape and it is integrally connected to the inner ball 51 at its narrow end. The interior of the combustion chamber 47 opens outwardly through a throat 58 which is formed between the inner ball 51 and the nozzle 48. The stem 52 provides an inlet passage for fuel and air (or oxygen) which is fed into the combustion chamber 47 through the fuel inlet slot 51' of the inner ball 51. The flow of fuel and air into the combustion chamber 47 is controlled by inlet control valve means 60 secured within the cylindrical stem 52.

Figure 10:
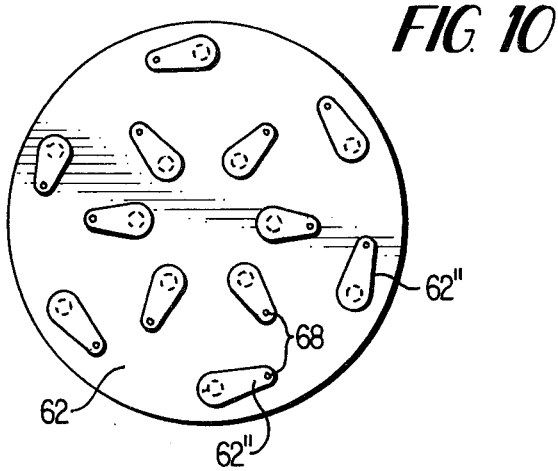
FIG. 10 is a bottom plan view of the fuel inlet control valve.
Figure 11:
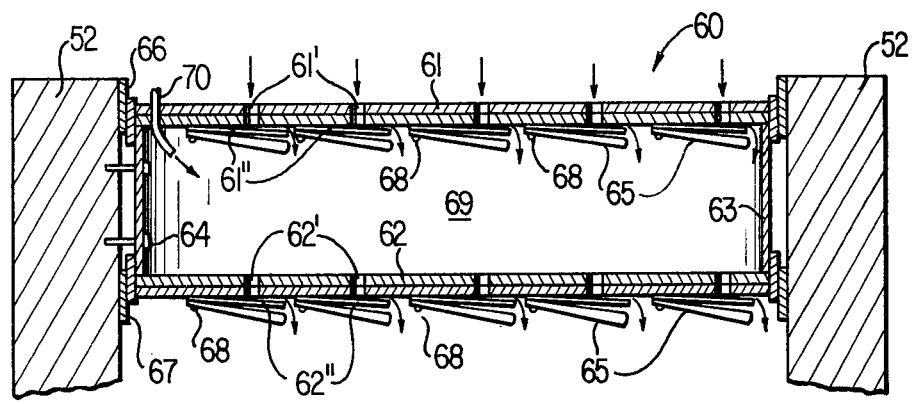
FIG. 11 is a vertical cross-sectional view through the fuel inlet control valve.
Figure 12:
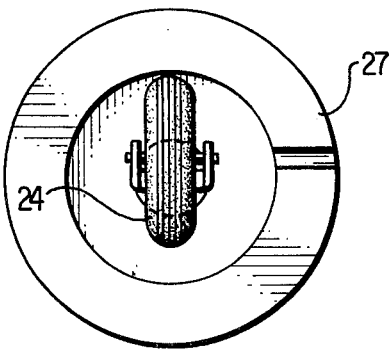
FIG. 12 is a bottom plan view of one of the landing gear of the flying ship according to this invention.
Figure 13:
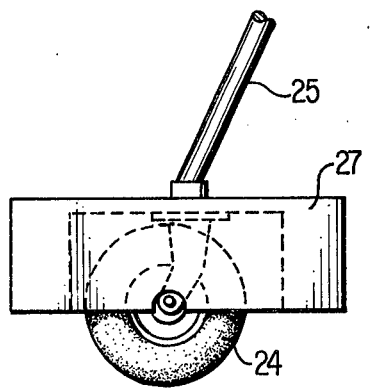
FIG. 13 is a side elevational view of the landing gear shown in FIG. 12.

The combustion chamber inlet control valve means 60 (best seen in FIGS. 10 and 11) includes axially spaced outer and inner apertured disks 61 and 62 closing the ends of a spacer cylinder 63 which is affixed to the interior wall of the stem 52 by bolts 64. Upper and lower seals 66 and 67 seal the space between the perimeter of the disks 61 and 62 respectively and the interior wall of the stem 52. The inner and outer disks 61 and 62 each have at least one valve passage 61' and 62' respectively therethrough and these are controlled by a like number of one-way valve elements 61" and 62" respectively which open to permit fluid flow through the apertures 61' and 62' respectively in the direction from outside of disk 61 into the combustion chamber 47 beneath the disk 62. The one-way valve elements 61" and 62" as shown are reed valves which are secured by screws 68 beneath the disks 61 and 62 respectively so that they swing toward and away from the disks depending upon which side of the respective disks has the greater pressure. The chamber 69 between the disks 61 and 62 is a mixing chamber where fuel and air (or oxygen) mix prior to entrance into the combustion chamber 47. An emergency fuel line 70 supplies fuel into the chamber 69 directly from a fuel supply system. Heat shields 65 are secured beneath each of the reed valves 61" and 62" in order to shield the valves from the heat of the gases in jet engine 19.

The control mechanism for adjusting the jet engines 19 to vary the direction of thrust of the gases discharging from the jet nozzles 48 is best understood by referring to FIGS. 3, 5, 5a, 6 and 9.

Looking first at FIG. 9, the jets 19 on each side of a center fore and aft line are shown to be mechanically connected in a train by tie rods 71. The nozzle 48 of each jet 19 has a pair of reinforcing rings 72,73 (See FIG. 6) secured about the nozzle at longitudinally spaced intervals, the ring 73 being located near the exhaust end of the nozzle and the ring 72 being located further up the nozzle. The ring 72 has radially projecting ears 74 and 75 formed diametrically opposite each other. The ears 74 and 75 each have a hole extending therethrough to receive a universal pivot 91 to which an end of one of the tie rods 71 is pivotally connected.

The jets 19-1 and 19-7 closest to the front and rear of the ship 10 are each connected to the next adjacent jet engine on the same side of the ship by a stretchable tie rod 71'. The tie rods 71' include a pair of telescoping sections, which are normally spring biased to a foreshortened condition. The stretchable tie rods 71' are required by the jet engines which turn the most about a vertical axis through the stem 52 (See FIG. 6) in a manner described subsequently.

Hydraulic reciprocating motors 76,76 are provided to tilt the jet nozzles between a vertical, downwardly entending position substantially normal to a plane through the ship including the peripheral edge 16 thereof and a position inclined rearwardly from the vertical, downwardly extending position. Each of the hydraulic motors 76,76 include a piston and cylinder, and hydraulic lines 77,78 connected to a conventional hydraulic system (not shown) for selectively supplying high pressure hydraulic fluid to one side of the motor piston or the other and exhausting hydraulic fluid from the opposite side of the piston from which the hydraulic fluid is supplied. The piston rods 79 of each motor 78 is connected to a crank lever arm 80 by a pivot pin 81 (FIG. 5). The crank lever arm 80 is affixed to a shaft 82 which is rotatably mounted in bearings 83 which are secured to the body of the ship. The end of the shaft 82 opposite from the crank arm 80 has affixed thereto a hinged lever arm 84. The hinged lever arm 84 has affixed to its end opposite the shaft 82 a slide 85 which is retained to slide within the slot 87 of a slide connection 86 secured longitudinally to one side of the number 3 engine 19-3. The hinged lever 84 includes an upper arm portion 89 which is non-rotatably affixed to the shaft 82 and a lower arm portion 90 which is swingably connected to the upper arm portion by hinge 88. The axis of the hinge 88 is normal to a plane including the axis of the shaft 82 and a longitudinal center line through the upper arm portion 89. Rotation of the crank arm 80 by the hydraulic motor 76 will cause rotation of the shaft 82 about the axis of the shaft 82. Rotation of the lever 84 about the axis of the shaft 82 will cause the jet nozzle 48 to tilt.

Rotation of each of the jets 19 about the longitudinal axis of the rotatably mounted stem 52 of the outer ball 50 of each jet engine is effected by means of a diamond-shaped tapered lever 92 which is mounted to rotate about the vertical center axis 93 through the ship as seen in FIG. 9. A reciprocating fluid motor 94, comprising a piston and cylinder, is connected to turn the tapered lever 92, when motive fluid is supplied from a fluid source (not shown) upon actuation of conventional fluid control means located in the pilot's cockpit. The stem 52 of each jet engine has a gear segment 95 at least partially encompassing the stem. A control rod 96, having a gear rack 97 on one end which engages the gear segment 95, is pivotally connected at its other end to the tapered lever 92 and is reciprocated backward and forward by the movement of the tapered lever 92 through small arcs in order to rotate the outer ball 50 and thereby to vary the horizontal direction of thrust of the jet engine when the jet is tilted.

The control mechanics illustrated in FIG. 9 are mounted between the sealed compartment 42 (see FIG. 2) and the lower floor 21. The jets 19 can be turned, after their nozzles 48 have been raised, from side to said thereby controlling the direction of movement of the ship 10. The tapered lever 92 will cause the front and back jets 19-1 and 19-7 to turn the most, and the jets 19-3, 19-4 amid ship to turn the least. This arrangement enables the ship to be turned in a very close turn. The jets 19 can be lowered or raised hydraulically for more or less lift, causing the saucer to tip up or down. When landing the jets 19 are moved straight down, and the fuel to the engines is reduced to cuase the ship to settle to the ground with the landing gear 23 down. The disc wheel covers 27 permit the ship to land on soft ground.

FIG. 14 shows the fuel injection system of the invention as well as a horizontal cross section through a portion of the motor tube 35 and motor train 36. A high pressure fuel pump 120 pumps fuel from the annular fuel tank 38 and delivers the fuel under high pressure into the fuel distribution block 121 via the pump discharge line 122. The fuel distribution block 121 has multiple outlets 123 (only one being shown) each of which is connected to a separate fuel line 124 which leads to a fuel injector 125. While only one outlet 123, one fuel line 124 and one fuel injector 125 are shown in FIG. 14, it will be understood that there are a plurality of each connected as shown in FIG. 14. Within each of the fuel lines 124 is located a one way valve 126 and a solenoid valve 127. The one way valve 126 is connected so as to permit flow of fuel from the fuel distribution block 121 toward the fuel injector tube 125, while blocking fuel flow in the opposite direction. The solenoid valve 127 includes a reciprocating valve element 128 which is normally biased to block the flow of fuel through the fuel line 124. A solenoid coil 129 surrounds the valve element 128, which is the solenoid armature, and opens the valve 127 when the coil 129 is energized. The injector tube 125 is press fitted into an inclined aperture in the annular motor tube 35 so that the inner end of the injector tube 125 is flush with the interior surface of the motor tube 35.

Within the annular motor tube 35, the motor train 36 is slidably mounted to move in the direction indicated by the arrow 131. The motor train 36 is made up of a plurality of solid cylindrical pistons 132 which are alternately interspersed with a plurality of hour glass shaped spacers 134 in an endless train. The pistons and spacers are molded together as a complete train of neopreme. Each piston 132 has an elongated permanent magnet core 137 extending coaxially throughout its length. The pistons 132 are of slightly smaller diameter than the inside diameter of the annular motor tube 35 so that they may slide through the tube without binding. Each piston 132 is provided with a set of two wheels 138 and 139 mounted to rotate on axles 140 and 141 respectively, formed at the opposite ends of an axle bar 142. The wheels 138 and 139 and their axles 140,141 are located in cavities 144, and 145 formed in the piston 132. The cavities 144 and 145 open outwardly and are of such size and shape to permit the wheels 138 and 139 to rotate freely therein. The axle bar 142 is mounted in a vertical plane normal to the longitudinal axis of the piston 132 and is bent to provide a vertical mid section 143 attached to the magnet core 137 and a pair of outwardly extending legs at the ends of which are formed the axles 138 and 139. The wheels 138 and 139 rotate on the axles 140,141 respectively and bear upon the inside surface of the motor tube 35 in order to support the piston 132 and assure the proper spacing of the piston relative to the radially outer wall portion of the motor tube 35 when the train 36 is rotating the centrifugal force acts on the piston tending to force it outwardly relative to the axis of the annular tube. The wheels 138 and 139 thus help to prevent binding of the pistons in the motor tube 35 when the train is rotating and subject to centrifugal force. The inside surface 35' of the annular motor tube 35 is smooth to reduce friction and may be coated with a friction reducing material.

Outwardly flaring resilient cup seals 146 and 147 are provided at leading and trailing ends respectively of each piston 132. The seals 146 and 147 are normally biased outwardly against the inner surface 35' of the motor tube 35 to provide a fluid tight seal.

Each hour glass shaped spacer 133 between adjacent pistons in the train 36 provides an annular cavity 149 between the spacer and the tube 35 and between seals 146 and 147 at opposite ends of the spacer.

Motion of the train 36 is caused by the force of intermittant bursts of fuel injected through the fuel injector tube 125 against the trailing end of the pistons 132. The angle of inclination of the injector tube relative to the motor tube 35 is selected so that the kinetic force of the injected fuel has a major force component in the direction of train movement indicated by the arrow 131. Except when the train is being started, the fuel injection is controlled automatically by the movement of the train in a manner which will be subsequently described. Fuel injected into the chamber 149 between the spacer 133 and the motor tube 35 is carried forward by movement of the train 36 until a fuel discharge port 130 through the bottom of the motor tube 35 is uncovered by the leading end of the spacer 133 and the piston seal 147. The fuel discharges through the port 130 while the chamber 149 is in communication with the fuel discharge port 130. The fuel discharge port 130 empties into an air intake duct, or shroud 37, surrounding the motor tube where it is mixed with air before being admitted into the combustion chamber of an associated jet engine 19 through the combustion chamber inlet control valve means 60 shown in FIG. 11.

Each piston 132 is further provided with a pendant weight 150 which hangs by a support rod 151 beneath the magnet core 137 into the motor tube 35. The weight 150 provides proper orientation for each piston within the tube 35.

The electrical control system for the fuel injection solenoid valve 127 as seen in FIG. 14 includes motor starting circuit comprising a push button starting switch 152 located in the control cockpit and connected in series circuit with a battery 153 and the coil 129 of the solenoid fuel valve. Momentary depression of the push button starting switch 152 completes the starting circuit thus energizing the fuel injection solenoid valve 127 and holding it open until the starting switch 152 is released. Although the starting switch 152 and battery 153 are shown connected to only one solenoid valve, it will be understood that the starting switch and battery 153 are connected to energize simultaneously each of the fuel injection solenoid valves for the plural injectors 125 supplying fuel to the jet engines 19.

The automatic means for energizing the fuel injection solenoid valves 127 includes a pivoted ferro magnetic yoke 154 which intermittently opens and closes a pair of switch contacts 155 and 156 connected in series circuit with the fuel injection solenoid valve 127, battery 153 and on-off switch 157. The yoke 154 includes a main central stem portion 158 extending radially inwardly from the inside wall portion of the motor tube 35 toward the center of the annular motor tube and arcuate yoke portions 159 and 160 diverging in opposite directions from the end of the stem portion 158 nearest the motor tube and partially surrounding the motor tube 35. The yoke 154 further includes a lever arm 161 bent at a right angle to the main stem portion 158 on its end opposite the arcuate yoke portions 159 and 160. The lever arm 161 is pivoted by a vertical pivot pin 162 located intermediate its ends to a housing 163 affixed to the inside wall portion of the motor tube 35. A rod 164 having one end affixed to the motor tube 35 entends radially inwardly from the annular tube 35 toward the axial center of the annular tube and projects through an aperture in the lever portion 161 between the main stem 158 and the pivot pin 162. A compression spring 165 is mounted on the rod 164 between the lever arm 161 and the motor tube 35. The threaded end 166 of the rod 164 projects through the lever arm 161 and threadedly engages a nut 167 to provide means for adjusting the bias of the spring 165 and to limit the counterclockwise motion of the main stem portion 158 relative to the pivot pin 162. A switch contact 156 is secured on the end of the lever arm 161 opposite the main stem 158 facing the switch contact 155. A conductor 168 extends between the switch contact 156 and an insulated connector post 169. The post 169 extends through the housing 163. A conductor 170 connects the connector post 169 to one side of the on-off switch 157 and a conductor 171 connects the other side of switch 157 to the negative side of battery 153. The intermittent switch contact 155 is affixed to the inner end of insulated connector post 172 which extends through housing 163. A conductor 173 connects the connector post 172 to one side of the solenoid valve coil 129 and a conductor 174 connects the other side of the solenoid valve coil to the positive side of battery 153 thus completing the automatic control circuit for the fuel injection solenoid valve 127.

The on-off switch 157, like the starting switch 152, is located in the control cockpit of the flying saucer and will be turned on when the pilot wishes to start the ship. With the on-off switch 157 turned on, the solenoid valve 127 is automatically energized intermittently as a result of motion of the motor train 36 once it has been set in motion. The bar magnet core of each piston 132 passing through the ferro magnetic yoke 154 will rock the yoke about its pivot pin 162 to open and close the switch contacts 155 and 156. Closing the contacts 155,156 completes the automatic control circuit, thus energizing the fuel injection solenoid valve 127. Opening the contacts 155,156 breaks the automatic control circuit thereby de-energizing the fuel injection solenoid valve and shutting off the fuel line 124 from the motor tube 35.

Also lacated within the housing 163 is a field winding 175, the coils of which are cut by the magnetic flux of the core magnet 137. A voltage is thus induced in the field winding 175 each time one of the pistons 132 passes adjacent the winding. The opposite ends of the field winding 175 are connected to connector posts 176 and 177 respectively which extend through the housing 163. A capacitor 165 is mounted on the inside of the housing 163 and is connected to cooperate with the coil 175 to provide a voltage impulse to ignite the fuel inside of the combustion chamber of one of the jet engines.

The powerful degaussing cable 17, shown in FIG. 16, is mounted about the circumferential edge of the ship 10. It is provided with electrical energy from the ships power system so that electric current flowing through the cable creates a magnetic field about the cable and the leading edge of the ship. This magnetic field interacts with the magnetic field of atoms and molecules in the atmosphere surrounding the ship tending to repulse them by pushing them away as the ship travels in flight, and causing less stress on the ship as the ship's speed increases. The magnetic field around the degaussing cable also interacts with the earth's magnetic field helping to lift the ship.

The flying saucer 10 is made of light non-magnetic material, such as magnesium. The degaussing cable 17 is shielded as much as possible to throw its field outward and downward.

The flying saucer of this invention may be of various sizes, however, in one form, a ship having a diameter of forty feet and a height (without the canopy 12) of ten feet is contemplated.

The coolant system for the ship 10 includes a pump 43 and conduit means for pumping coolant fluid from the cooling tank 32 to near the top of the ship, where the coolant is distributed by an annular distribution pipe 100 to the space between the inner and outer layers 15 and 31. The coolant then flows downward between the layers 15 and 31 and is returned to the coolant tank 32.

The fluid motor tube 35 is surrounded by an electrical generator winding 98 best seen in FIG. 4. The winding 98 includes a plurality of interconnected spaced coil sections 99 encircling the fluid motor tube 35. As the endless train 36 moves through the tube 35 and the magnetic flux surrounding the core magnets 137 cuts the coils of the winding 98, voltages are induced in the winding 98 which cause electricity to be generated. The electrical generator supplies the electrical load system of the ship.

The circular motion of the train 36 when it reaches full speed causes the train to function as a huge gyroscope to provide stability for the ship. When in outer space, a smaller gyroscope provided, but now shown, helps maintain the ship in the correct attitude so that the large fluid motor train 36 can be stopped to save fuel. The four solar batteries 14 will then be used to keep the ships batteries charges.

OPERATION

The flying ship 10 when on the ground and supported by the extended landing gear 23 (of which there are four) is readied for take-off by directing the jet engine nozzles 48 vertically downward. This is done by the pilot in the cockpit 13 using conventional hydraulic controls to actuate the engine tilt motors 76. The tilt motors 76 on opposite sides of the ship operate through the control mechanisms shown in FIG. 5 to rotate the number 3 engines down, whereupon the remaining engines are rotated down by means of the tie rods 71,71' connecting all of the jet engines on one side of the ship in a train.

Referring now to FIG. 14, the pilot throws the on-off switch 157 to on and presses the start button 152 in the starting circuit for the jet engines. In so doing, the pilot energizes all of the fuel solenoid valves 127 of which there are eight in parallel (only one being shown). Jet engine fuel is then supplied under high pressure from the fuel tank 38, pump 120, distribution block 121 and the now open fuel lines 124 to the fuel injectors 125. A burst of fuel is injected behind pistons 132 in the train 36 which causes the train to move forward in the direction of the arrow 131 (FIG. 14). The injected fuel in cavity 149 is carried forward by the train until an outlet port 130 in the bottom of the tube 35 is uncovered whereupon the fuel from cavity 149 is discharged through outlet port 130 into the air inlet shroud 37, where it is mixed with air and then enters through the jet inlet control valve 60 into the combustion chamber 47 of the jet engine (see FIG. 6). Motion of the train 36 also causes intermittent electrical electrical impulses to be generated at the terminals 176,177 which are conducted by suitable conductors (not shown) to an ignitor (not shown) provided in the combustion chamber 47. After the initial burst of fuel has been supplied to start the fluid motor 36 forward, the automatic fuel injection circuit including the on-off switch 157, interrupter contacts 155,156 solenoid valve 127 and battery 153 now takes over to automatically and intermittently supply bursts of fuel through the injectors 125, each time a magnet core 137 passes through the ferro magnetic yoke 154, to rock the yoke. Once the jet engines 19 have fired, the upwardly directed thrust on the ship caused by the downwardly directed jets lifts the ship from the ground. Once airborn, the jets are tilted rearwardly to provide a horizontal thrust component which moves the ship forward as well as up. Level flight can be maintained by tilting the jets sufficiently toward the horizontal so that the downward force of gravity on the ship is balanced by the vertical lift component of the jet engines and the aerodynamic lift resulting from the aerodynamic configuration of the saucer as the saucer moves through the earth's atmosphere. A tunnel of air flows through the bottom of the ship as illustrated in FIG. 9. The pilot moves the ship to the right or left by actuating the fluid motor 94 to rotate the lever 92, and to move the jet nozzles 48 from side to side.

On landing the ship 10 can be flown under power toward the surface of the earth in an inclined flight path, and when near the ground the ship can be set down vertically by directing the jets vertically downward and by reducing the fuel supplied to the jets so that the lift provided by the the jets is gradually reduced to allow the ship to settle gradually to the ground under its own weight.

The generator winding 98 is connected in circuit with the main battery 45 through a battery charger (not shown) for charging the battery 45 when the fluid motor train 36 is rotating. The generator winding is also connected through appropriate switching means (not shown) to an electrical distribution system in order to supply electrical energy directly to various electrical load devices such as electric lights, pump motors, etc.

As shown in FIG. 6, each of the jets 19 includes a wink valve 101 at the outlet end of the jet nozzle 48 to control the flow of gases from the nozzle. The wink valve 101 includes a pair of blades 101a and 101b which are pivoted about parallel shafts 103,103 extending centrally through the discharge end of nozzle and pivotally mounted therein. The blades 101a and 101b are each curved outwardly at their outer end to direct the jet gases outwardly. The blades pivot between the open outwardly extended position shown in full lines to the closed position shown by dotted lines. Suitable control means (not shown) are provided to move blades 101a and 101b between the open and closed positions.

The skins 15 and 31 at the top of the ship 10 are spaced about three and one-half inches apart and the space between the skins is filled with loosely packed fibers 104. The fibers retard and distribute the flow of coolant between the skins.

Suitable coolants for use in the coolant system of the flying ship 10 are antifreezes, suchf as Prestone and the like, and are preferably coolants which include a large proportion of ethylene glycol which reduces corrosion.

An additional feature which may be included but which is not shown, is the provision of an annular helium bag within the ship 10 to provide additional lift. One or more of the braces within the ship may be removed or relocated to make room for the helium bag.

The bottom of the ship 10 has a double floor, similar to the double skin at the top. The spacing between the floor preferably tapers as it extends from the center of the ship. The floor under the annular fluid motor tube 35 is preferably a removable annular section which may be lowered in order to lower the annular fluid motor tube 35 from the ship for repair.

While in the foregoing there has been described and shown a preferred embodiment of the invention, various modifications and equivalents may be resorted to within the spirit and scope of the invention as claimed.

What is claimed is:

1. A flying ship comprising a hollow saucer-shaped body, plural jet engines for lifting and propelling said ship, an annular fluid motor tube concentrically mounted within said saucer-shaped body, an endless train of spaced pistons slidably mounted within said annular fluid motor tube, injection means for injecting high pressure jets of fuel into said fluid motor tube behind said pistons to cause sliding movement of said train of pistons in one direction within said tube, plural fuel outlet means from said fluid motor tube for conducting fuel from said fluid motor tube to said jet engines, jet mounting means for adjustably mounting each of said jet engines to said body beneath said annular fluid motor tube, each of said jet engines having fuel inlet means in communication with one of said plural fuel outlet means from said fluid motor tube, and control means for varying the direction of fluid thrust produced by said engines, said endless train of pistons when moved by said high pressure fuel jets providing gyroscopic action to stabilize said flying ship in flight.

2. The flying ship according to claim 1 wherein each of the pistons of said endless train has a permanent magnet core, electric generator coil means encircling said annular fluid motor tube for the generation of an electric current within said coil means in response to the passage of said train of pistons through said tube and encircling generator coil means, and load means in circuit with said electric generator coil means for utilizing said electric current.

3. The flying ship according to claim 2 together with a storage battery, and charging means in circuit with said generator coil means and said storage battery for charging said battery.

4. The flying ship according to claim 1 wherein each of said jet engines comprises a ball and socket joint and a jet nozzle projecting from said ball and socket joint, said ball and socket joint including a hollow outer ball socket, and a hollow inner ball having sliding bearing contact within said outer ball socket, said outer ball socket having an open cylindrical stem projecting radially outwardly therefrom and having an opening in its side oppposite said cylindrical stem, said inner ball having openings on opposite sides to provide a fluid passage therethrough, said jet nozzle being connected with said inner ball about one of said openings of said inner ball and projecting outwardly therefrom through the opening in said outer ball socket which is opposite said stem, said inner ball and said outer ball sockets forming the combustion chamber of said jet engine, and said hollow stem providing the fuel inlet means in communication with the combustion chamber, and one way valve means provided in said cylindrical stem to permit fluid flow through the cylindrical stem into said combustion chamber while preventing fluid flow in the opposite direction.

5. The flying ship according to claim 4 wherein said jet mounting means for each of said jet engines includes rigid support means mounted beneath one of the plural fuel outlet means from said annular fluid motor tube; a rotary bearing carried by said rigid support means, said rotary bearing including an outer race affixed to said rigid support means, and an inner race affixed concentrically to said cylindrical stem of said outer ball socket, said inner race being rotatably supported within said outer race whereby said outer ball socket may be rotated about the axis of said cylindrical stem.

6. The flying ship according to claim 5 wherein said jet mounting means further includes a thrust brace extending downwardly from said body into contact with the outer surface of said outer ball socket, said thrust brace having an arcuate bearing portion partially encircling said outer ball socket, and antifriction bearing means interposed between said arcuate bearing portion and said outer ball socket to permit rotation of said outer ball socket relative to said thrust brace.

7. The flying ship according to claim 4 wherein said nozzle of each of said jet engines has a discharge end remote from said inner ball, and a wink valve mounted in said discharge end for opening and closing said nozzle.

8. The flying ship according to claim 4 together with a separate air duct for each of said jet engines, each of said air ducts having an air intake louver mounted in the upper surface of said flying ship above one of said jet engines and an outlet communicating with the fuel inlet means of said jet engine.

9. The flying ship according to claim 8 wherein said annular fluid motor tube passes through each of said air ducts forming a barrier which causes air flow flowing through the duct to divide and pass on opposite sides of said annular fluid motor tube.

10. The flying ship according to claim 4 wherein said one-way valve means comprises a pair of axially spaced parallel disks mounted transversely within said cylindrical stem of said outer ball socket, at least one valve passage through each of said spaced disks, and a valve closure element for each of said valve passages, each valve element being mounted to close an associated valve passage when the pressure on the side of the disk closest to the combustion chamber exceeds the pressure on the opposite side of the disk, and to open an associated valve element when the pressure is reversed.

11. The flying ship according to claim 10 wherein the space between said spaced disks provides an air fuel mixing chamber, and a fuel inlet duct projects through the outer most of said disks to inject fuel into said air fuel mixing chamber.

12. The flying ship according to claim 10 wherein said valve elements are flap valves pivotally mounted on the side of an associated disk closest to said combustion chamber to swing toward and away from the disk on which it is mounted.

* * * * *